(12) United States Patent  
Spring

(10) Patent No.: US 9,788,528 B2  
(45) Date of Patent: Oct. 17, 2017

(54) INTERWOVEN DENTAL CARE PRODUCT FOR PETS

(71) Applicant: NUTRI-VET WELLNESS, LLC, Chesterfield, MO (US)

(72) Inventor: Timothy J. Spring, Princeton, NJ (US)

(73) Assignee: NUTRI-VET WELLNESS, LLC, Chesterfield, MO (US)

( * ) Notice: Subject to any disclaimer, the term of this patent is extended or adjusted under 35 U.S.C. 154(b) by 2 days.

(21) Appl. No.: 14/603,678

(22) Filed: Jan. 23, 2015

(65) Prior Publication Data

US 2015/0201585 A1 Jul. 23, 2015

Related U.S. Application Data

(60) Provisional application No. 61/930,500, filed on Jan. 23, 2014.

(30) Foreign Application Priority Data

Dec. 15, 2014 (EP) ..................................... 14198016

(51) Int. Cl.  
*A01K 15/02* (2006.01)  
*A61D 5/00* (2006.01)  
*A23K 50/40* (2016.01)

(52) U.S. Cl.  
CPC ............ *A01K 15/026* (2013.01); *A23K 50/40* (2016.05); *A61D 5/00* (2013.01)

(58) Field of Classification Search  
CPC ..... A01K 15/025; A01K 15/026; A23K 1/106  
USPC ................................................. 119/710–711  
See application file for complete search history.

(56) References Cited

U.S. PATENT DOCUMENTS

| 1,149,170 | A | * | 8/1915 | Allis .................... A01K 15/026 |
|---|---|---|---|---|
| | | | | 119/710 |
| 4,254,101 | A | | 3/1981 | Denny, Jr. |
| 4,310,558 | A | | 1/1982 | Nahm, Jr. |
| 4,364,925 | A | | 12/1982 | Fisher |
| 4,419,372 | A | | 12/1983 | Greene et al. |
| 4,702,929 | A | | 10/1987 | Lehn et al. |

(Continued)

OTHER PUBLICATIONS

Booda Fresh N Floss Three Knot Tug Rope; Jun. 1, 2013; <http://wwwschatzistreasures.com/booda-fresh-n-floss-three-knot-tub-rope.html>.*

(Continued)

*Primary Examiner* — Monica Williams  
*Assistant Examiner* — Michael A Fabula  
(74) *Attorney, Agent, or Firm* — Armstrong Teasdale LLP

(57) ABSTRACT

A dental care product for a pet, such as a dog, includes at least one chew strand having a fragrance and at least one flossing strand. The flossing strand is formed from rawhide and has a thickness less than a thickness of the chew strand. The chew strand and the flossing strand are interwoven with each other along a length of the dental care product to define an interwoven portion of the dental care product. The flossing strand is wrapped around and binds free ends of the chew strand in a wrapped portion of the dental care product. The free ends extend outwardly from the wrapped portion of the dental care product on a side of the wrapped portion opposite the interwoven portion of the dental care product. Advantageously, the dental care product permits the strands to abrade with the pet's teeth in various ways to deliver cleaning benefits.

18 Claims, 2 Drawing Sheets

(56) References Cited

U.S. PATENT DOCUMENTS

| | | | |
|---|---|---|---|
| 4,924,811 A | 5/1990 | Axelrod | |
| 5,033,410 A * | 7/1991 | Sigurdsson | A01K 15/026 119/710 |
| 5,215,038 A * | 6/1993 | O'Rourke | A01K 15/026 119/710 |
| 5,329,881 A * | 7/1994 | O'Rourke | A01K 15/026 119/709 |
| 5,392,734 A * | 2/1995 | Laone | A01K 15/026 119/710 |
| 5,467,741 A * | 11/1995 | O'Rourke | A01K 15/026 119/710 |
| 5,477,815 A * | 12/1995 | O'Rourke | A01K 15/026 119/710 |
| D382,382 S * | 8/1997 | Weinacker, Jr. | D30/160 |
| 5,711,254 A * | 1/1998 | O'Rourke | A01K 15/026 119/710 |
| 5,947,060 A * | 9/1999 | Weinacker | A01K 15/026 119/709 |
| 6,044,800 A * | 4/2000 | Kubo | A01K 15/026 119/709 |
| 6,050,224 A * | 4/2000 | Owens | A01K 15/026 119/709 |
| 6,178,922 B1 * | 1/2001 | Denesuk | A01K 1/0152 119/710 |
| 6,200,616 B1 | 3/2001 | Axelrod et al. | |
| 6,250,254 B1 | 6/2001 | Weinacker | |
| 6,277,420 B1 | 8/2001 | Anderson et al. | |
| 6,365,133 B1 * | 4/2002 | Rich | A23K 1/1853 424/48 |
| 6,455,083 B1 | 9/2002 | Wang | |
| 6,555,094 B1 | 4/2003 | Glandorf et al. | |
| 6,701,592 B2 | 3/2004 | Veloce | |
| D496,521 S | 9/2004 | Tepper et al. | |
| 6,904,870 B2 | 6/2005 | Russell-Maynard et al. | |
| 7,147,888 B2 | 12/2006 | Brown et al. | |
| 7,205,015 B2 | 4/2007 | Shu | |
| 7,879,377 B2 | 2/2011 | Dahl et al. | |
| 8,215,267 B2 | 7/2012 | Axelrod et al. | |
| 8,479,687 B2 | 7/2013 | Anderson et al. | |
| D728,171 S * | 4/2015 | Byrne | D30/160 |
| 2004/0115247 A1 | 6/2004 | Melman | |
| 2004/0197455 A1 | 10/2004 | Nie et al. | |
| 2005/0244554 A1 | 11/2005 | Weinberg | |
| 2005/0260306 A1 | 11/2005 | Baldus | |
| 2007/0193531 A1 * | 8/2007 | Anderson | A01K 15/026 119/709 |
| 2007/0289552 A1 | 12/2007 | Axelrod et al. | |
| 2008/0035071 A1 * | 2/2008 | Veloce | A01K 15/026 119/710 |
| 2008/0251033 A1 * | 10/2008 | Dennis | A01K 15/026 119/709 |
| 2008/0289584 A1 * | 11/2008 | Fay | A01K 15/026 119/712 |
| 2009/0007854 A1 * | 1/2009 | Cooper | A01K 15/025 119/707 |
| 2009/0056641 A1 * | 3/2009 | Freeman | A01K 15/025 119/707 |
| 2011/0232580 A1 * | 9/2011 | Renforth | A01K 15/025 119/707 |
| 2012/0186535 A1 * | 7/2012 | Tu | A01K 15/026 119/710 |
| 2013/0017758 A1 * | 1/2013 | Cooper | A01K 15/025 446/490 |
| 2013/0047932 A1 * | 2/2013 | Salmon Hyder | A01K 15/026 119/710 |
| 2013/0097901 A1 * | 4/2013 | Cooper | A01K 15/026 40/299.01 |
| 2013/0327279 A1 * | 12/2013 | Prange | A23K 1/1853 119/710 |
| 2013/0344010 A1 * | 12/2013 | Pompejus | A23L 1/3014 424/50 |
| 2014/0216357 A1 * | 8/2014 | Wechsler | A01K 15/025 119/707 |
| 2015/0000611 A1 * | 1/2015 | Cooper | A63H 33/00 119/707 |

OTHER PUBLICATIONS

Fresh 'N Floss 2 Knot Rope Bone; Oct. 19, 2011; <http://valleyvet.com/ct_detail.html?pgguia63e08d6-7196-4cfd-ba96-7152e2f2f1ba>.*

Valerian Root: Smell; Henriette's Herbal Homepage; May 23, 1995; <http://www.henriettes-herb.com/archives/best/1995/valerian.html>.*

Ehrlich, Steven; Peppermint; Last reviewed on Jul. 6, 2014; University of Maryland Medical Center; Complementary and Alternative Medicine Guide: Herb: Peppermint; <http://umm.edu/health/mediacl/altmed/herb/peppermint>.*

Huebner, Lisl; Cardamom—If at first you don't succeed, Chai Chai again; Oct. 19, 2009; The Essence of Herbs; <http://herbalisl.blogspot.com/2009/10/cardamom-if-at-first-you-dont-succeed.html>.*

Ladd, Lorna; 5 Ways to improve your dog's breath (hint: they cost under $2.00!); Feb. 19, 2015; Ruff Ideas; <http://www.happytailsspa-blog.com/2015/02/19/improve-your-dogs-breath/>.*

Gupta, Chandra; Passion Flower; Accessed Sep. 30, 2016; Fragrantica; <http://www.fragrantica.com/notes/Passion-Flower-162.html>.*

Mentha; Last Modified Sep. 28, 2016; Wikipedia; <https://en.wikipedia.org/wiki/Mentha#Traditional_medicine_and_cosmetics>.*

Jeanroy, Amy; 10 Best Herbs for Making Potpourri; Accessed Sep. 30, 2016; abouthome; <http://herbgardens.about.com/od/herbalcraftsandgifts/tp/10-Best-Herbs-For-Making-Potpourri.htm>.*

Basil; Last Modified Sep. 29, 2016; Wikipedia; <https://en.wikipedia.org/wiki/Basil>.*

J3443RY; Dog Toys for Heavy Chewers; Oct. 29, 2012; <http://www.instructables.com/id/Dog-Toys-for-Heavy-Chewers/?ALLSTEPS>.*

* cited by examiner

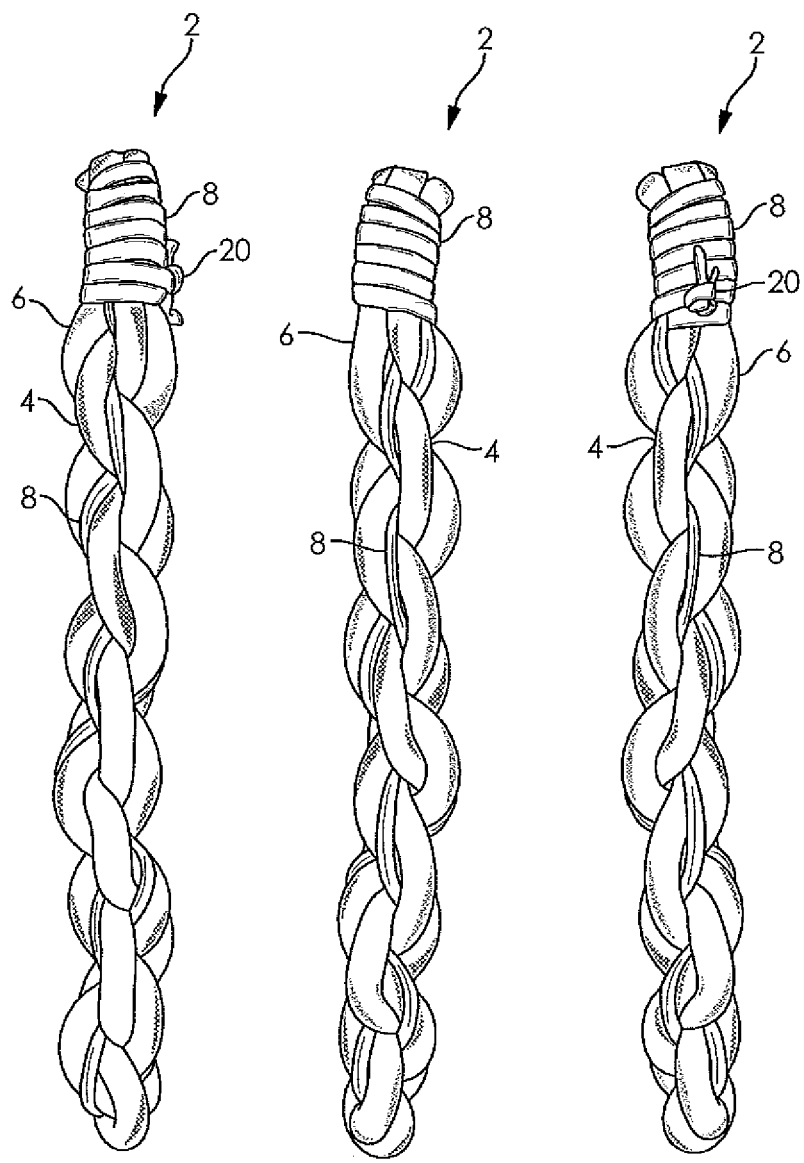
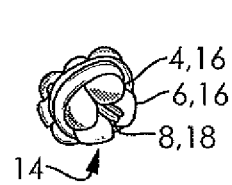 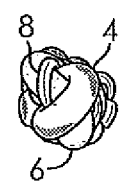
FIG. 3   FIG. 4   FIG. 5
FIG. 6   FIG. 7

INTERWOVEN DENTAL CARE PRODUCT FOR PETS

CROSS-REFERENCE TO RELATED APPLICATIONS

This application claims the benefit of European Patent Application No. 14198016.9, filed on Dec. 15, 2014, and U.S. Provisional Application No. 61/930,500, filed on Jan. 23, 2014. The entire disclosures of the above applications are hereby incorporated herein by reference.

FIELD

The present disclosure relates to a dental care product for a pet and, more particularly, to an edible dental care product that cleans the pet's teeth when chewed.

BACKGROUND

Available dental care products for pets, such as dogs, include toothbrushes with which an owner cleans the pet's teeth to remove plaque or tartar. Bone-like chewable products are also known that, while chewed, clean the teeth making use of the dogs' habit of toying. However, brushing dog's teeth can be difficult for the owner, and it does not work if a dog hates its teeth being brushed. The chewable toy products are not very effective, because a dog tends to quickly lose interest in the same product.

There is a continuing need for an edible dental care product for a pet that continuously engages the pet, cleans to the gum line, provides a flossing action to reduce stubborn plaque and tartar buildup, and freshens the pet's breath with every bite.

SUMMARY

In concordance with the instant disclosure, an edible dental care product for a pet that continuously engages the pet, cleans to the gum line, provides a flossing action to reduce stubborn plaque and tartar buildup, and freshens the pet's breath with every bite, is surprisingly discovered.

In an exemplary embodiment, an edible product has three strands that are interwoven along a length the product (e.g., 3" (7.62 cm) in length for small dogs, and 7" (17.78 cm) in length for large dogs). The strands include: 1) a thin ⅛" (0.32 cm) flossing strand formed from rawhide; 2) a thick ¼" (0.63 cm) (silica- and fragrance-infused chew strand; and 3) a thick ¼" (0.63 cm) fragrance-only chew strand. The strands are intertwined to provide chewing difficulty for the dog as it chews and pulls the strands apart. The chew strands are formed by extruding a composition having rice flour, rawhide, tapioca, vegetable glycerin, vegetable oil, silica (optional), extract of mint, parsley, potassium sorbate, yellow #5, and blue #1. The composition includes protein (min) 15%, fat (min) 0.5%, fiber (max) 2.5%, and moisture (max) 18%. The rawhide strand is white, the silica/fragrance strand is light green, and the fragrance-only strand is dark green. The free ends of the light- and dark-green strands are bound by the rawhide. This particular configuration surprisingly permits the various strands to abrade with the dog's teeth in various ways to deliver cleaning benefits.

In one embodiment, a dental care product for a pet, such as a dog, includes at least one chew strand and at least one flossing strand. The at least one chew strand has a fragrance and, optionally, a silica filler. The flossing strand is formed from a resilient edible material. The flossing strand has a thickness that is less than a thickness of the chew strand. The chew strand and the flossing strand are interwoven with each other along a length of the dental care product to define an interwoven portion of the dental care product. The flossing strand is wrapped around and binds free ends of the chew strand in a wrapped portion of the dental care product. The free ends extend outwardly from the wrapped portion of the dental care product on a side of the wrapped portion opposite the interwoven portion of the dental care product.

DRAWINGS

The above, as well as other advantages of the present disclosure, will become readily apparent to those skilled in the art from the following detailed description, particularly when considered in the light of the drawings and photographs forming a part of this application and described hereafter.

FIG. 3 is a rear elevational view of the dental care product shown in FIG. 1;

FIG. 4 is a right side elevational view of the dental care product shown in FIG. 1;

FIG. 5 is a left side elevational view of the dental care product shown in FIG. 1;

FIG. 6 is a bottom plan view of the dental care product shown in FIG. 1; and FIG. 7 is a top plan view of the dental care product shown in FIG. 1.

DETAILED DESCRIPTION

Figure 1:
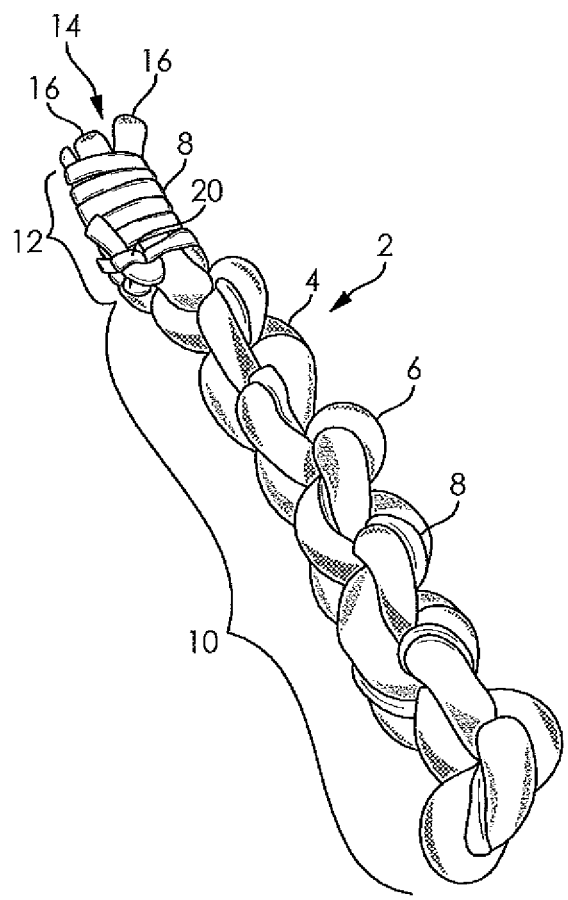
FIG. 1 is a front perspective view of a dental care product for pets, according to one embodiment of the present disclosure.

The following description is merely exemplary in nature and is not intended to limit the present disclosure, application, or uses. It should also be understood that throughout the drawings, corresponding reference numerals indicate like or corresponding parts and features.

Figure 2:
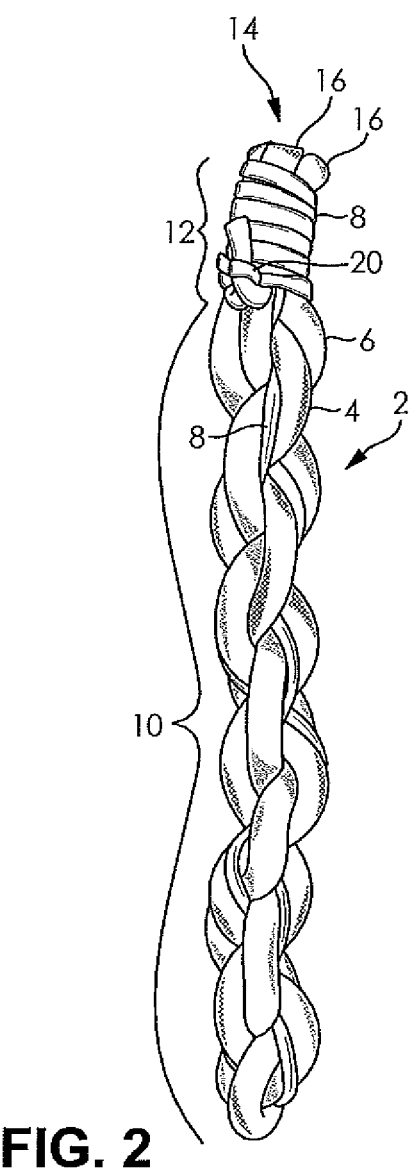
FIG. 2 is a front elevational view of the dental care product shown in FIG. 1.

FIGS. 1-7 show a dental care product 2 for a pet, such as a dog. The dental care product 2 may be fully or partially edible, or entirely non-edible, as desired. The dental care product 2 includes at least one chew strand 4, 6 and at least one flossing strand 8. In the particular embodiment shown in FIGS. 1-7, the at least chew strand 4, 6, may include a first chew strand 4 and a second chew strand 6. However, one of ordinary skill in the art may select any number of chew strands 4, 6 and flossing strands 8, as desired.

The chew strands 4, 6 are elongate strings or ropes that may be formed from an edible composition. The chew strands 4, 6, may be formed by an extrusion process or a molding process, as nonlimiting examples. Suitable materials for the edible composition may include animal and vegetable materials, for example, as described in U.S. Pat. No. 6,044,800 to Kubo et al. Other suitable materials for a pet will be recognized by a skilled artisan, and may be also employed.

The chew strands 4, 6 include a fragrance that is configured to freshen the breath of the pet as it chews the product. In one embodiment, the fragrance is an extract of mint. A skilled artisan may also select other fragrances within the scope of the present disclosure.

Food grade coloring agents may also be used. For example, the first chew strand 4 with just fragrance may be a dark green color through the addition of yellow and blue food coloring agents. The second chew strand 6 may be made a lighter green color through use of the same food coloring agents and the addition of a silica filler, as another example.

In a particular embodiment, the edible composition for the first chew strand 4 may include rice flour, rawhide, tapioca, vegetable glycerin, vegetable oil, extract of mint, parsley, potassium sorbate, yellow #5, and blue #1. The edible composition for the second chew strand 6 may include the same formulation, but with the silica filler added to provide additional cleaning performance. The edible compositions may include protein (min) 15%, fat (min) 0.5%, fiber (max) 2.5%, and moisture (max) 18%. Other suitable materials and nutrition content for the edible composition of the chew strands 4, 6 may also be selected, as desired.

The flossing strand 8 of the present disclosure is formed from thin strips of a resilient material. The flossing strand 8 may be edible or non-edible, as desired. As a nonlimiting example, the flossing strand 8 may be rawhide, i.e., an edible hide or animal skin that has not been exposed to tanning. One of ordinary skill in the art may select other types of resilient materials for the flossing strand 8, as desired.

A thickness of the flossing strand 8 is less than a thickness of each of the chew strands 4, 6. For example, the thickness of each of the chew strands 4,6 may be twice or more than the thickness of the flossing strand 8. In a particular embodiment, a thickness of the flossing strand 8 is about 0.32 cm (⅛"), and the thickness of each of the chew strands 4, 6 is about 0.63 cm (¼"). Importantly, the thinner flossing strand 8 is believed to impart a flossing-type action when the dental product 2 is chewed by the pet. One of ordinary skill in the art may select alternate suitable thicknesses for the chew strands 4, 6 and the flossing strand 8, within the scope of the disclosure.

As best illustrated in FIGS. 1-7, the dental care product 2 of the disclosure has an interwoven portion 10, a wrapped portion 12, and a free end portion 14. In the interwoven portion 10, the chew strands 4, 6 and the flossing strand 8 are interwoven with each other along a length of the dental care product 2. In the wrapped portion 12, the flossing strand 8 is wrapped around and binds free ends 16 of the chew strands 4, 6. The free ends 16 extend outwardly from the wrapped portion 12 of the dental care product 2 on a side of the wrapped portion 12 opposite the interwoven portion 10 of the dental care product 2 to define the free end portion 14. Free ends 18 of the flossing strand 8 may also extend outwardly from the wrapped portion 12 of the dental care product 2. Advantageously, the free ends 18 are believed to impart a cleaning action when the dental product 2 is chewed by the pet.

In a particular embodiment, the dental care product 2 also has a knot 20 formed with the flossing strand 8 on the wrapped portion 12. The knot 20 may provide an additional feature for the pet to chew, and facilitate a continued interest in the dental care product 2.

Although the dental care product 2 shown in FIGS. 1-7 is substantially linear in shape, it should be understood that other shapes for the dental care product 2 are also contemplated and may be employed, as desired. The other shapes may be formed by twisting or tying the substantially linear dental care product 2 into other shapes, for example. In another example, the other shapes may be formed by weaving together the various chew strands 4, 6 and the flossing strand 8 in different weaving patterns.

It should be appreciated that each of the interwoven portion 10, the wrapped portion 12, and the free end portion 14 of the dental care product impart different cleaning action while being chewed by the pet. In combination, the interwoven portion 10, the wrapped portion 12, and the free end portion 14 continuously engages the pet, cleans to the gum line, provides a flossing action to reduce stubborn plaque and tartar buildup, and freshens the pet's breath with every bite.

While certain representative embodiments and details have been shown for purposes of illustrating the invention, it will be apparent to those skilled in the art that various changes may be made without departing from the scope of the disclosure, which is further described in the following appended claims.

What is claimed is:

1. A dental care product for a pet, comprising:
   at least one chew strand; and
   at least one flossing strand configured to floss teeth of the pet when the dental care product is chewed by the pet, the at least one flossing strand having a thickness less than a thickness of the at least one chew strand,
   wherein the at least one chew strand and the flossing strand are interwoven with each other along a length of the dental care product to define an interwoven portion of the dental care product, the interwoven portion forming a first end of the dental care product, the at least one chew strand and the flossing strand being interwoven together such that ends of the at least one chew strand are located at a second end of the dental care product opposite the first end,
   wherein the at least one chew strand has free ends that are free from being interwoven with the at least one flossing strand, the at least one flossing strand being wrapped around and binding the free ends of the at least one chew strand to define a wrapped portion of the dental care product, wherein the at least one flossing strand circumscribes the frees ends by at least one revolution.

2. The dental care product of claim 1, wherein the at least one chew strand includes a first chew strand and a second chew strand.

3. The dental care product of claim 2, wherein the second chew strand further includes a silica filler.

4. The dental care product of claim 1, wherein the free ends extend outwardly from the wrapped portion of the dental care product on a side of the wrapped portion opposite the interwoven portion of the dental care product to define a free end portion of the dental care product.

5. The dental care product of claim 1, further including a knot formed with the at least one flossing strand on the wrapped portion.

6. The dental care product of claim 1, wherein the free ends of the at least one flossing strand also extend outwardly from the wrapped portion of the dental care product.

7. The dental care product of claim 1, wherein the at least one flossing strand is about 0.32 cm (⅛") thick and is formed from rawhide.

8. The dental care product of claim 1, wherein the at least one chew strand has a fragrance, the fragrance being an extract of mint.

9. The dental care product of claim 1, wherein the at least one chew strand includes a first chew strand having an edible composition including rice flour, rawhide, tapioca, vegetable glycerin, vegetable oil, extract of mint, parsley, and potassium sorbate.

10. The dental care product of claim 9, wherein the at least one chew strand includes a second chew strand having an edible composition including rice flour, rawhide, tapioca, vegetable glycerin, vegetable oil, extract of mint, parsley, potassium sorbate and further including a silica filler added to provide cleaning performance.

11. The dental care product of claim 1, wherein the at least one chew strand defines an edible composition including protein (min) 15%, fat (min) 0.5%, fiber (max) 2.5%, and moisture (max) 18%.

12. The dental care product of claim 1, wherein a thickness of the at least one flossing strand is about 0.32 cm (⅛"), and a thickness of the at least one chew strand is about 0.63 cm (¼").

13. The dental care product of claim 1, wherein the at least one chew strand is formed by an extrusion process.

14. The dental care product of claim 1, wherein the at least one chew strand is formed by a molding process.

15. A dental care product for a pet, comprising:
a plurality of chew strands including a first chew strand having a fragrance and a second chew strand having a silica filler; and
at least one flossing strand formed from rawhide and having a thickness less than a thickness of each of the chew strands,
wherein the chew strands and the flossing strand are interwoven with each other along a length of the dental care product to define an interwoven portion of the dental care product, the interwoven portion forming a first end of the dental care product, the chew strands and the flossing strand being interwoven together such that ends of the chew strands are located at a second end of the dental care product opposite the first end,
wherein the chew strands have free ends that are free from being interwoven with the at least one flossing strand, the at least one flossing strand being wrapped around and binding the free ends of the chew strands to define a wrapped portion of the dental care product, wherein the at least one flossing strand circumscribes the frees ends by at least one revolution, the at least one flossing strand configured to be prevented from unwrapping.

16. The dental care product of claim 15, wherein the free ends extend outwardly from the wrapped portion of the dental care product on a side of the wrapped portion opposite the interwoven portion of the dental care product to define a free end portion of the dental care product.

17. The dental care product of claim 15, further including a knot formed with the at least one flossing strand on the wrapped portion.

18. A dental care product for a pet, comprising:
a plurality of extruded chew strands including a first chew strand having a fragrance and a second chew strand having a silica filler; and
at least one non-extruded flossing strand formed from rawhide and having a thickness less than a thickness of each of the chew strands,
wherein the chew strands and the flossing strand are interwoven with each other along a length of the dental care product to define an interwoven portion of the dental care product, the chew strands having free ends that are free from being interwoven with the flossing strand, the flossing strand being wrapped around and binding the free ends of the chew strands to define a wrapped portion of the dental care product, the interwoven portion forming a first end of the dental care product, the chew strands and the flossing strand being interwoven together such that ends of the chew strands are located at a second end of the dental care product opposite the first end.

* * * * *